United States Patent

[11] 3,581,436

[72] Inventor James D. Basiger
 107 N. Kellogg St., Elsinore, Calif. 92330
[21] Appl. No. 762,566
[22] Filed Sept. 25, 1968
[45] Patented June 1, 1971

[54] PLANT SHIELD
 1 Claim, 4 Drawing Figs.
[52] U.S. Cl. .................................................. 47/26, 160/24
[51] Int. Cl. ............................................. A01g 13/02
[50] Field of Search ............................................. 47/20—31, 44, 47; 111/7.1; 160/266, 24

[56] References Cited
UNITED STATES PATENTS
| 445,510 | 1/1891 | Black | 111/7.1 |
| 2,863,177 | 12/1958 | Nelson et al. | 47/29X |
| 2,975,999 | 3/1961 | Bunch | 47/47X |

FOREIGN PATENTS
| 590,442 | 3/1965 | France | |
| 469,311 | 7/1914 | France | 47/20 |
| 138,795 | 5/1930 | Switzerland | 47/31 |

Primary Examiner—Robert E. Bagwill
Attorney—Herbert C. Schulze

ABSTRACT: This is a shield for plants, and the like, in which there are four supports carrying between each pair of supports a roll, or spindle. A sheet of plastic or screen or other shielding material is maintained between the two rolls and it is possible to lengthen, shorten, tilt, and raise and lower each end corner of the screen or the like by appropriate mechanism. The four end supports are adapted to be driven into the ground. The item is used to protect plants and the like from birds, sun, rain and the like.

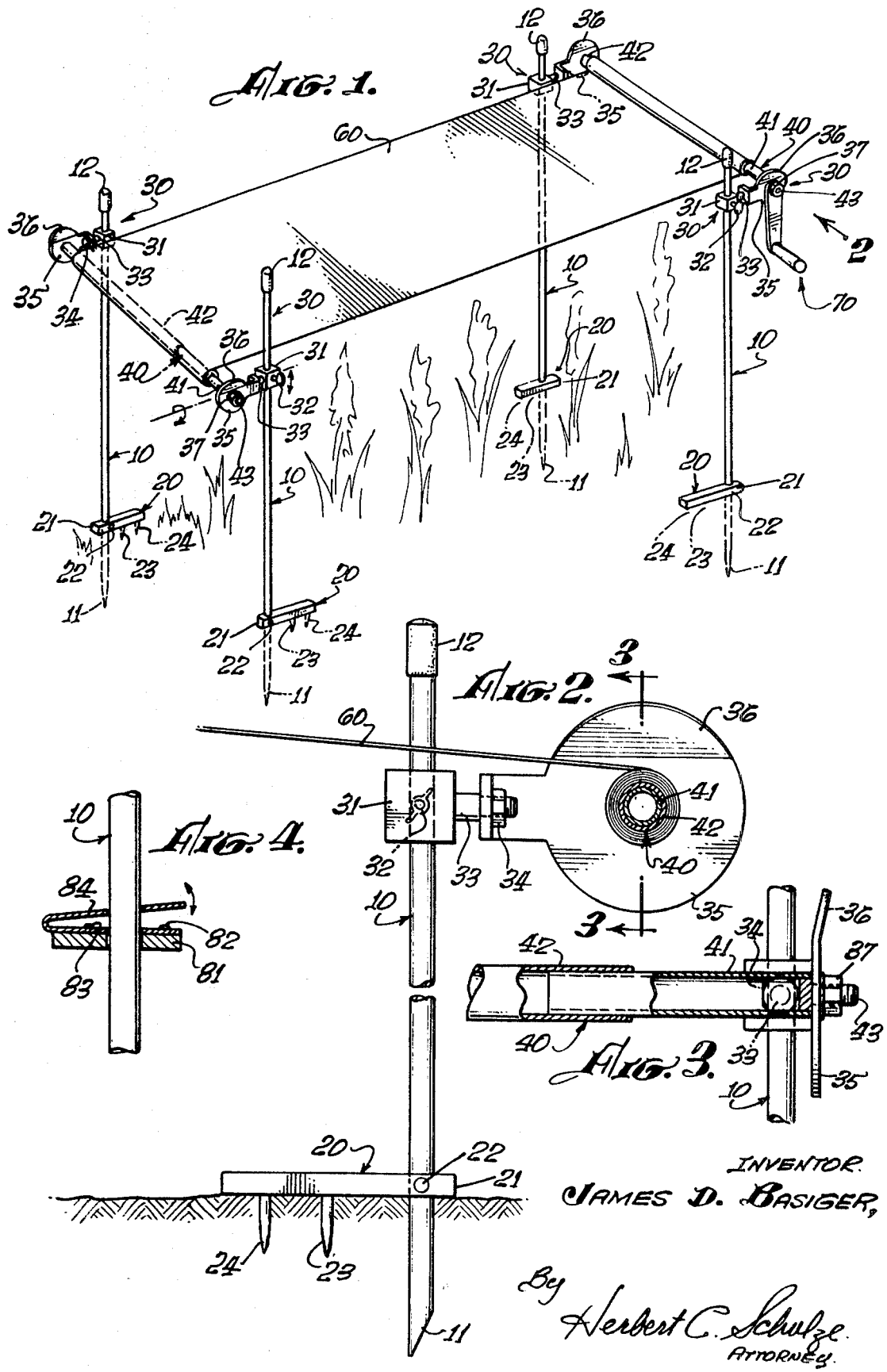

PLANT SHIELD

BACKGROUND OF THE INVENTION

1. Field of the Invention

This invention is in the field of protective devices for plants and the like and more particularly is in the field of an adjustable protective device to protect varying size areas and varying size plants from natural weather conditions as well as from birds and other pests.

2. Description of the Prior Art

There is no known prior art in this field, except that in the past it has been customary to lay sheets of plastic, screen, and the like directly upon plants or to make more or less permanent installations of such material either elevated, or not, in order to attempt to protect plants, or to provide buildings and the like to enclose them.

The present invention is a portable and fully adjustable device for adequately protecting plants from birds and the like as well as from adverse weather conditions.

SUMMARY

It has long been deemed desirable to protect plants from birds, insects, pests, and adverse weather conditions. It is recognized that many attempts to protect young plants, and older plants, have been made including wrapping individual shrubs with plastic or paper sheeting or screening; covering individual plots on the ground with plastic sheets, burlap, and the like; building enclosures about individual plants and the like.

All of the methods used have been unsatisfactory as being particularly cumbersome in most instances; as being time consuming in installation; and for other obvious reasons of ineffectiveness or difficulty of operation.

I have devised a mechanism comprising two sets of two posts each in which a roll of screening material or the like is attached to one of the sets of stakes and a takeup reel is attached to the other stake.

Each end of the roll of material and takeup reel has been provided with appropriate swivel and adjustment means so that individual ends of the roll, and particularly, individual corners thereof may be tilted, raised, lowered, and the like, to accommodate for differences in heights of plants, to provide for rain runoff, to provide shading from sun, to provide shielding from birds and the like; to provide for all methods of and requirements for the shielding of young plants or plants bearing fruits, berries, and the like which are readily attacked either by weather conditions or birds and the like.

Thus it is an important object of this invention to provide a flexible and portable means for shielding plants;

It is a further object of this invention to provide a device as outlined in which individual edges may be raised or lowered;

It is a further object of this invention to provide a device which can be readily installed and removed by one person.

The foregoing and other objects and advantages of this invention will be clear to those skilled in the art upon reading the following specification and description in conjunction with the attached drawing.

BRIEF DESCRIPTION OF THE DRAWINGS

FIG. 1 is a perspective of a preferred embodiment of this invention;

FIG. 2 is an enlarged, partially sectioned view at 2 on FIG. 1;

FIG. 3 is a partially sectioned view on 3-3 of FIG. 2; and

FIG. 4 is an alternate embodiment of clamping mechanism used throughout the embodiment shown in the foregoing Figures.

DESCRIPTION OF A PREFERRED EMBODIMENT

It will be observed that there are four posts 10, each identical to the other; and four like elements 30, four like elements 20, and two like takeup reels 40. One handle 70 has been provided upon one of the takeup reels for rolling in the screening or shielding material 60.

There is a roll of screening material, burlap, plastic, or other shielding material 60 wrapped around the takeup reels 40 which does not have the handle. Each takeup reel is telescopic comprising an element 41 sliding within an element 42 as indicated particularly well in FIG. 3. In this manner the takeup reels can be lengthened or shortened to accommodate wider or narrowing sheets of shielding material 60.

The takeup reels are held at their ends by an appropriate shaft 43 fixedly fastened (not shown) by welding or the like within the respective takeup reel sections 42 and 41. Each of the shafts 43 shown is fastened to a flangelike element 35, on bracket 30. The flanged element 35 is flared as indicated at 36 to guide the shielding material 60 if desired. Each flange 35 is fastened by a swivel arrangement to a holding block 30.

The swivel arrangement comprises a shaft 33 fixedly attached to holding block 31, the shaft terminates in a threaded connection as indicated particularly well in FIG. 2 and is held in place upon the bracket 35 by nut 34.

A lock screw 32 is threaded through the wall of block 31 to provide for clamping for each assembly 30 upon its respective post 10.

Each post 10 has a pointed end 11 and a capped end 12.

Each of the posts is also provided with a unit 20 which is a stabilizing foot unit. Each unit 20 comprising a block 21 having holding spikes 23 and 24 and a lock screw 22 threaded through its body to be locked upon post 10.

As previously mentioned, a handle 70 has been attached to one of the reels 40 as indicated in FIG. 1. By using this handle the shielding material 60 may be shortened or increased in length as will be clear to those skilled in the art.

The connection of the handle to the shaft 43 has not been shown but such is customary and well known to those skilled in the art.

The edges of the bracket 30 have been bent backwards as indicated at 36 in order to guide the screening material when it is being rolled up upon the ends for this reason the handle 70 will have an offset or the like, not clearly shown, in order that it will not bump against the flange 36 when being used.

An alternate embodiment of a clamping device has been shown in FIG. 4 in which a block of material 81 has been fastened to it by suitable bolts or the like 82 and 83 a piece of spring steel or the like 84. A hole through the block 81 and through the spring material 84 between the bolts 82, 83 and also, in its upper portion, provide for a clamping action. When the spring 84 is pressed together it is allowed to slide up and down but when it is released it locks itself upon the leg by means well known in the art. This block can be utilized for rapid action in place of all of the clamping mechanisms both on the feet and on the bracket carrying devices as may be desired.

In use the four posts are driven into the ground and the feet are pressed down to hold them as desired surrounding the area to be protected. The shielding material 60 is let out to the proper length between the takeup reels and the individual ends 30 may be moved up and down to provide whatever configuration is desired for protection and whatever height is desired by the circumstances.

The takeup reels are held in their position by friction through the attachment of the nuts 37 on the shafts 43. If desired, ratchets and the like, well known in the art, but not illustrated, may be substituted however for all practical uses a friction grip is sufficient to hold the material 60 in proper position.

It will be noted that this device can be used to carry burlap, for example, upon which water may be sprayed where humidity conditions are desired to be controlled; it may carry a sun screening material where it is desired to protect young plants from hot sun; it may carry wire netting, or the like, to protect against, birds; and may be generally used to control and protect the environment of individual or collective plants both as to protection from insects and the like as well as to control weather conditions. By the ability to raise and lower each individual end corner, shade may be provided from the direction desired and rain and the like may be caused to flow off in a given direction.

While the embodiment of this invention shown and described is fully capable of achieving the objects and advantages desired, many modifications will be clear to those skilled in the art without departing from the inventive concepts disclosed herein. It is not my intention to be restricted to the particular embodiment shown which is for illustrative purposes only.

I claim:

1. A device for protecting plants from weather elements comprising: two pairs of rigid stakes suitable for substantially vertical mounting in the earth; a takeup reel mounting bracket vertically, and slidably, adjustably mounted upon each of said stakes, each of said mountings incorporating a swivel connection to provide for angular relationship between said stakes and the takeup reels hereinafter described; a flange on each of said swivel connected brackets, each flange having an outwardly flaring upper portion to guide the sheet of material hereinafter described while being transferred between said takeup reels, said flanges holding said material upon said reels regardless of relative alignment thereof, and said flaring portions guiding said material onto said reels during transfer of said material between said reels; a takeup reel mounted between each pair of mounting brackets; handle means connectable to said reels to provide rotation thereof; a sheet of flexible material mounted at opposite ends thereof to said reels in such manner as to allow takeup and transfer of the material from reel to reel; and means upon the lower end of each stake adaptable to penetrate the earth so as to provide stability to each stake.